INVENTORS:
BERNARD C. PHILLIPS,
BY ROBERT K. TURNER.
Harry O. Ernsberger
ATTORNEY

INVENTORS:
BERNARD C. PHILLIPS.
BY ROBERT K TURNER.
Harry O. Ernsberger
ATTORNEY

INVENTORS:
BERNARD C. PHILLIPS,
BY ROBERT K. TURNER.
Harry O. Ernsberger
ATTORNEY

May 10, 1966  B. C. PHILLIPS ET AL  3,250,224

PUMPING MEANS FOR A CHARGE FORMING APPARATUS

Filed Aug. 20, 1962  5 Sheets-Sheet 5

INVENTORS:
BERNARD C. PHILLIPS.
BY ROBERT K TURNER.
Harry O. Ernsberger
ATTORNEY United States Patent Office 3,250,224
Patented May 10, 1966

3,250,224
PUMPING MEANS FOR A CHARGE
FORMING APPARATUS
Bernard C. Phillips and Robert K. Turner, Toledo, Ohio,
assignors to The Tillotson Manufacturing Company,
Toledo, Ohio, a corporation of Ohio
Filed Aug. 20, 1962, Ser. No. 218,004
4 Claims. (Cl. 103—150)

This invention relates to apparatus for delivering fuel to an internal combustion engine and more especially to an arrangement for feeding fuel to a charge forming device or apparatus through which a fuel and air mixture is delivered to an engine.

In the operation of internal combustion engines and particularly those of the two cycle type for use in powering chain saws, lawn mowers, outboard marine engines and other engine driven equipment, it is imperative to provide an arrangement for delivering fuel into the mixing passage of a charge forming apparatus or carburetor irrespective of the relative angular position of the fuel feeding means and charge forming apparatus. For example, engines for operating chain saws must be capable of functioning in extreme angular and inverted positions, and engines employed for powering lawn mowers and other portable equipment must be capable of operation in extreme angular positions.

The fuel feeding arrangement should have adequate capacity to deliver the requisite amount of liquid fuel to the charge forming apparatus or carburetor to obtain maximum or high speed operating conditions. A fuel feed or pump arrangement for supplying fuel to a carburetor employed with engines for the above uses must necessarily be compact because of the limited space available to accommodate a pumping means.

Diaphragm type fuel pumps have been employed as fuel feed means for carburetors for comparatively small engines wherein the diaphragm is pulse operated through connection with a source of varying fluid pressure, as for example, the crankcase of a two cycle engine or the manifold of a four cycle engine or other source of varying fluid pressure. The diaphragm of pumps of this character are vibrated at comparatively high frequencies and, where small engines of the two cycle type operate at upwards of ten thousand revolutions per minute, the diaphragm is vibrated at a frequency of ten thousand or more times per minute. While theoretically a pump of the diaphragm type will deliver fuel at a rate or amount substantially equal to the displacement of the diaphragm at each pumping impulse, it is found that the fuel delivery efficiency of the pump materially decreases, particularly at higher engine speeds, apparently because of the lag or delay of the liquid fuel due to inertia and momentum of the fuel to follow or be in synchronism with the vibratory movements of the diaphragm.

The tendency has been to increase the engine speeds and difficulties have been encountered in supplying adequate fuel for high speed operation with the conventional pulse operated, diaphragm type pumps, such as the pump construction shown in the patent to Phillips 2,796,838.

The present invention embraces the provision of a fuel feeding means of the pulse-operated diaphragm type for charge forming apparatus, the fuel feeding means being constructed and arranged to deliver an increased amount of liquid fuel as the speed of the engine increases whereby an ample supply of fuel for the charge forming apparatus is maintained at all engine speeds without increasing the size or displacement of the fuel feeding means.

An object of the invention is the provision of a liquid feeding means or pump of the pulse-operated diaphragm type wherein the inlet and outlet passages or passage systems of the pump are associated or provided with an elastic or compressible medium for cushioning the ram effect of the liquid under the high frequency action of the vibrating diaphragm and the rapid opening and closing movements of the inlet and outlet valves of the pump.

Another object of the invention resides in the means for stabilizing or utilizing to advantage the inertia and momentum factors of the moving liquid in a pulse-operated diaphragm pump through an elastic or compressible medium associated with the inlet or outlet passages or both of the pump whereby the pumping efficiency is substantially increased particularly at high frequencies of vibration or actuation of the diaphragm.

Another object of the invention resides in the provision of an elastic or stabilizing medium in contact with the liquid moving through the passage system of the pump, the medium being yieldable whereby to foster more uniform or smooth flow of liquid through the pump and especially at high frequencies of vibration of the diaphragm.

A further object of the invention resides in the provision of an elastic or yieldable media associated with the inlet and outlet passageways of a pulse-operated diaphragm type pump for cushioning the momentum of the moving liquid in the passages set up by vibratory action of the diaphragm and the operation of the valve means in the pump.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

While the fuel feed and charge forming apparatus has been illustrated as particularly constructed and arranged for use in supplying fuel to an engine of the so-called two cycle type, it is to be understood that the fuel feed arrangement of the invention may be utilized with other types of charge forming apparatus or for pumping purposes generally for pumping liquids wherever high speed diaphragm pumping action is desired and the diaphragm actuated by pulsating or varying fluid pressures.

Referring to the drawings in detail and initially to the form of the invention shown in FIGURES 1 through 8, there is illustrated a fuel feed arrangement or pump of the diaphragm type fashioned as a unit pump construction which may be used with a charge forming apparatus or carburetor for pumping liquid fuel from a supply to the carburetor or which may be employed for pumping other liquids for other purposes where high frequency pumping action of a diaphragm is utilized.

The pump 10 is inclusive of a body or body construction comprising body components or members 12 and 14 which, in the embodiment illustrated in FIGURES 1 through 8, are of generally rectangular shape and arranged in mating relation. Disposed between the body components 12 and 14 is a flexible pumping diaphragm or membrane 16 and a sealing gasket 18.

The pumping diaphragm or membrane 16 is impervious and is formed of highly flexible material, such as, synthetic rubber or fabric impregnated or coated with a material which is resistant to the effects of hydrocarbon fuels to render the fabric imperforate.

The diaphragm is of a thickness of from three thousandths of an inch to forty thousandths of an inch. In the form shown in FIGURES 1 through 8, the pump body components 12 and 14 are secured together by means of screws 20 which extend through registering openings formed in the diaphragm 16 and the gasket 18.

The central regions of the body components are shaped with concave recesses to form a cavity and the diaphragm 16 extends across the cavity to form a pumping chamber 22 and a fuel receiving chamber 24. As particularly shown in FIGURE 5, the body component 14 is fashioned with a nipple portion 26 formed with a passage 27 in communication with the pumping chamber 22, the nipple portion 26 accommodating the end of a tube 28 which is adapted to be connected with the crankcase of a two cycle engine or other source of varying fluid pressure, the varying pressures or impulses causing vibration or actuation of the diaphragm 18.

The body member 12 is formed with a boss portion 30 which is integrally formed with a second nipple portion 32 adapted to be connected by means of a tube 34 with a fuel tank (not shown) or other supply of liquid fuel. The body component 12 is formed with a boss portion 36 provided with a threaded portion 37 which is adapted to be threaded into an inlet passage 38 formed in a boss portion 39 of a charge forming apparatus or carburetor or other apparatus with which the pump may be utilized.

The direction of flow of liquid fuel through the pump is controlled by valve means preferably in the form of flap valves 40 and 42 which in the embodiment illustrated are integrally formed as portions of the diaphragm 16.

Figure 6:
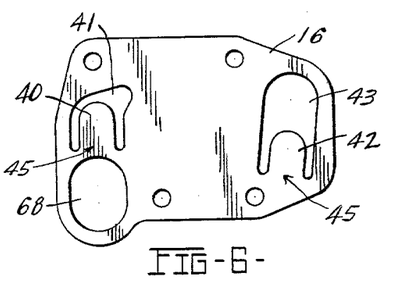
FIGURE 6 is a plan view of the pumping diaphragm.

The valve 40 is the fuel inlet valve and the valve 42 is the outlet valve, which as shown in FIGURE 6, are formed as tongues by removing material from the diaphragm providing the spaces 41 and 43 to facilitate passage of fuel as hereinafter described.

The valves 40 and 42 are flexed about the hinge regions 45 at their zones of integral connection with the diaphragm. The boss portion 30 and the nipple portion 32 are formed with a fuel inlet passage 44 which is in communication with a duct or port 46 adjacent the inlet valve 40 as particularly shown in FIGURE 4. The inlet flap valve 40 at opening movements is flexed into a recess or passage 48 which is in communication with the fuel chamber 24 by interconnecting ducts 49 and 50 of the fuel inlet passage system.

Figures 1, 3, 4, 5:
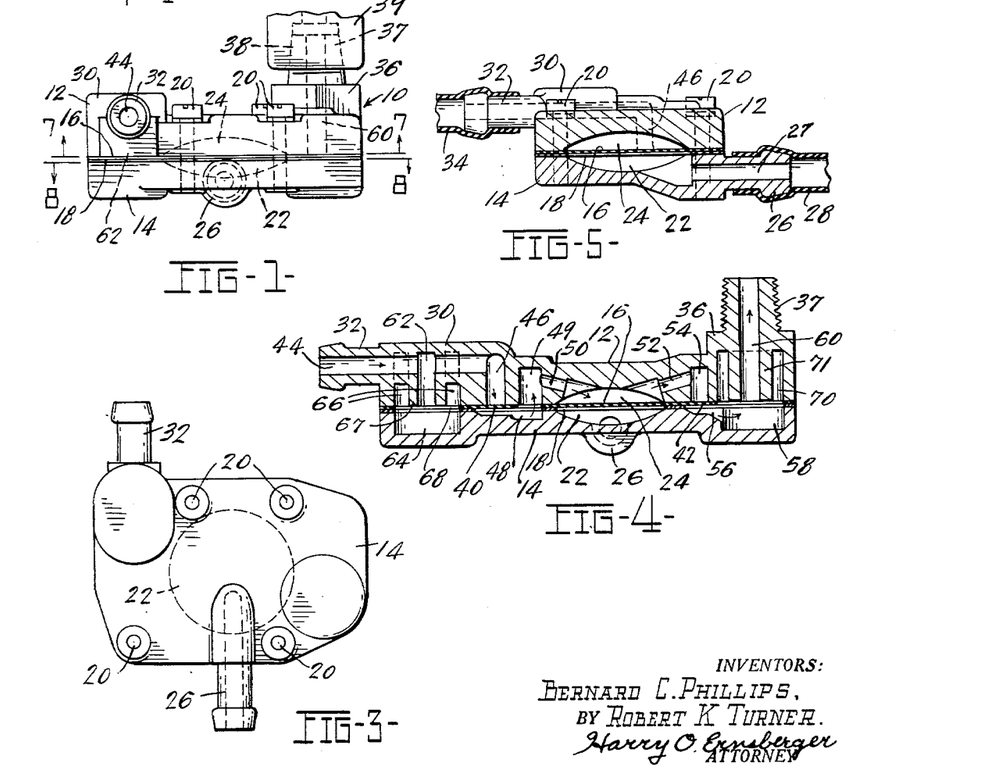
FIGURE 1 is a side elevational view of a fuel feed or pump construction embodying the invention.
FIGURE 3 is a bottom plan view of the construction shown in FIGURE 1.
FIGURE 4 is a sectional view taken substantially on the line 4—4 of FIGURE 2.
FIGURE 5 is a sectional view taken substantially on the line 5—5 of FIGURE 2.
Figure 2:
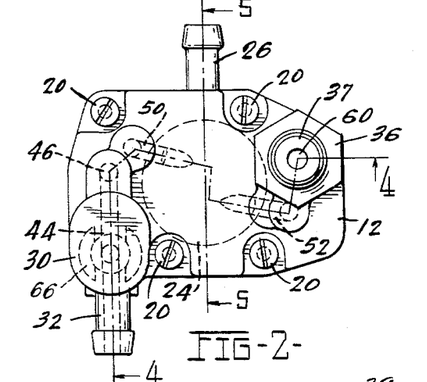
FIGURE 2 is a top plan view of the construction illustrated in FIGURE 1.

The fuel outlet passage system for the pump includes a duct 52 which is in communication with the fuel chamber 24 and with an outlet port or duct 54, the port 54 being controlled by the outlet flap valve 42. As shown in FIGURE 4, the flap valve 42 at opening movements is flexed into a recess 56 formed in the body component 14 in communication with a fuel outlet passage 60 formed in the boss 36 and the threaded extension 37 for conveying fuel into a carburetor.

Thus, a suction impulse set up in the pumping or pulsing chamber 22 flexes the diaphragm downwardly, as viewed in FIGURE 4, establishing reduced pressure in the fuel receiving chamber 24 which causes the fuel inlet valve 40 to open and admit fuel into the fuel chamber 24.

Upon a succeeding pressure pulsation in the pumping chamber 22, the diaphragm 16 is flexed upwardly, causing the inlet valve 40 to close, forcing fuel in the chamber 24 through passages 52 and 54 past the outlet valve 42 for delivery into the carburetor with which the pump may be used.

The pump components so far described are similar to those of the pump disclosed in Phillips' patent 2,796,838. The pump construction illustrated in the Phillips' patent above referred to is usually adequate to deliver sufficient quantities of fuel for supplying fuel mixture to an internal combustion engine of the two cycle type where the engine speeds up to about six thousand revolutions per minute are involved.

However, at higher engine speeds there is a substantial decrease in fuel pumping efficiency, apparently due to the adverse effects of inertia and momentum characteristics of the fuel on the opening and closing action of the valves. Hence, while the theoretical pumping capacity of the pump should be substantially equal to the actual displacement of the diaphragm at each vibration or suction and pressure cycle, this theoretical efficiency is not attained because of the inertia and momentum characteristics of the fuel in moving through the pump and such efficiency could only be attained if the liquid fuel had no mass or inertia.

The diaphragm pump of the invention includes an elastic or yieldable media arranged in communication with the fuel inlet or outlet passages, or both, for elastically cushioning or absorbing energy of the momentum of the moving liquid fuel and subsequently transferring the potential energy so imparted to the elastic media to the fuel to assist in moving the fuel through the valves to attain a substantial increase in the fuel pumping efficiency of the pump whereby the pumping efficiency at higher engine speeds is increased with the speed of the engine so that adequate fuel supply to the carburetor is maintained at all engine speeds.

In the form illustrated particularly in FIGURE 4, the boss portion 30 is provided with a branch passage 62 which is in communication with the fuel inlet passage 44 and with a chamber 64 formed in the pump body component 14. The pump body 12 is fashioned with spacial regions 66 which, in effect, form a portion of the chamber 64. The diaphragm 16 is fashioned with an opening 68 and the gasket 18 provided with a similar registering opening of the contour of the chamber 64 whereby the chamber 64 including the regions 66 are filled with air providing an elastic, yieldable or compressible media which absorbs, dissipates or receives potential energy momentum of the fuel moving through inlet passage system when the inlet valve 40 is closed by a compressive movement of the diaphragm 16 against the fuel in the chamber 22.

The body member 14 is fashioned with a chamber 58 adjacent the outlet port of the valve 42 in communication with the recess 56 and an annular space 70 defined by a boss 71, the chamber 58 and the annular space 70 forming, in effect, a single chamber filled with air and acting as a compressible means or elastic cushioning media which absorbs or dissipates some energy of momentum of the fuel moving past the outlet valve 42 to promote more smooth flow or delivery of fuel into the carburetor through the passage 60 as well as to increase the flow of fuel through the pump, particularly at high frequency vibration of the diaphragm at high engine speeds.

Hence, through the elastic, yieldable or compressible media arranged in communication with the fuel inlet passage anteriorly of the inlet valve 40 and the compressible or elastic media provided by the chamber components 58 and 70 posteriorly of the outlet valve 42, it is found that the flow rate or amount of fuel delivered through the pump by the pumping action of the diaphragm is generally proportionately increased as the speed of the engine increases. The arrangement of the invention provides adequate fuel for an engine operating at comparatively high speeds without any increase in the sizes of the pumping chamber, the fuel passages, valves or the valve port areas.

The elastic energy receiving media elastically stabilizes, or renders more smooth, the flow of liquid or liquid fuel through the pump providing the increased pumping efficiency that is attained.

In the form shown in FIGURE 4, the chamber regions 58 and 64 perform important functions when the pump is used in an inverted position from that shown in FIGURE 4 as when an engine driven chain saw with which the pump may be used is operated in extreme angular or inverted positions. It is therefore desirable to make the pumping unit as "position-free" as possible.

Thus, there will always be some air in the chamber or region formed by spaces 64 and 66 and some air in the chamber or region formed by the spaces 58 and 70 irrespective of the relative position of the pump.

Figure 15:
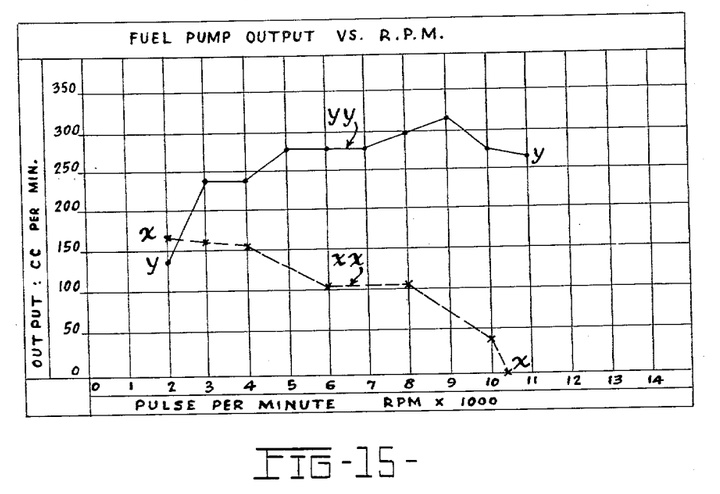
FIGURE 15 is a graph showing the relative pumping efficiency of the pump construction of the invention compared with a conventional diaphragm type pump of the same size.

FIGURE 15 illustrates graphically tests or results of operation of the diaphragm pump embodying the elastic stabilizing chambers as compared with a diaphragm pump of the same size without the stabilizing chambers. On the graph, FIGURE 15, the broken line XX shows fuel output in cubic centimeters per minute at engine speeds from two thousand revolutions per minute to slightly more than ten thousand revolutions per minute of a two cycle engine with which a carburetor of the conventional diaphragm type structure was used, the pump used being similar to that shown in FIGURES 1 through 8 but without the elastic stabilizing chambers.

The line YY on the graph, FIGURE 15, illustrates the fuel output of a pump of the same size and character embodying the elastic stabilizing chambers of the invention as shown in FIGURE 4.

Thus, from the graph, it will be seen that at two thousand revolutions per minute the conventional diaphragm type pump delivers approximately 170 cubic centimeters per minute; at four thousand revolutions per minute the fuel delivery is reduced to about 160 cubic centimeters per minute; at six thousand revolutions per minute the fuel delivery is reduced to slightly more than 100 cubic centimeters per minute, and at ten thousand revolutions per minute the fuel output is reduced to about 40 cubic centimeters per minute. Thus, it will be seen that generally as the engine speed increases, the fuel delivery rate of the conventional type diaphragm pump decreases.

With reference to the line YY, it will be seen that at two thousand revolutions per minute the fuel output of the pump is about 135 cubic centimeters per minute; at three thousand revolutions per minute the fuel output is increased to about 240 cubic centimeters per minute; at five thousand revolutions per minute the fuel pump output increases to about 280 cubic centimeters per minute and at nine thousand revolutions per minute the fuel pump output is about 320 cubic centimeters per minute.

It will thus be seen that the fuel pump embodying the elastic media or stabilizing chambers of the invention provides for a substantial increase in fuel output and improved pumping efficiency which is generally in proportion to the increased speed of the engine. The use of the pump embodying the invention therefore provides an adequate fuel supply to the engine irrespective of the engine speed or the relative position of the fuel pump.

Figures 7, 8, 9, 10, 11, 12, 13:
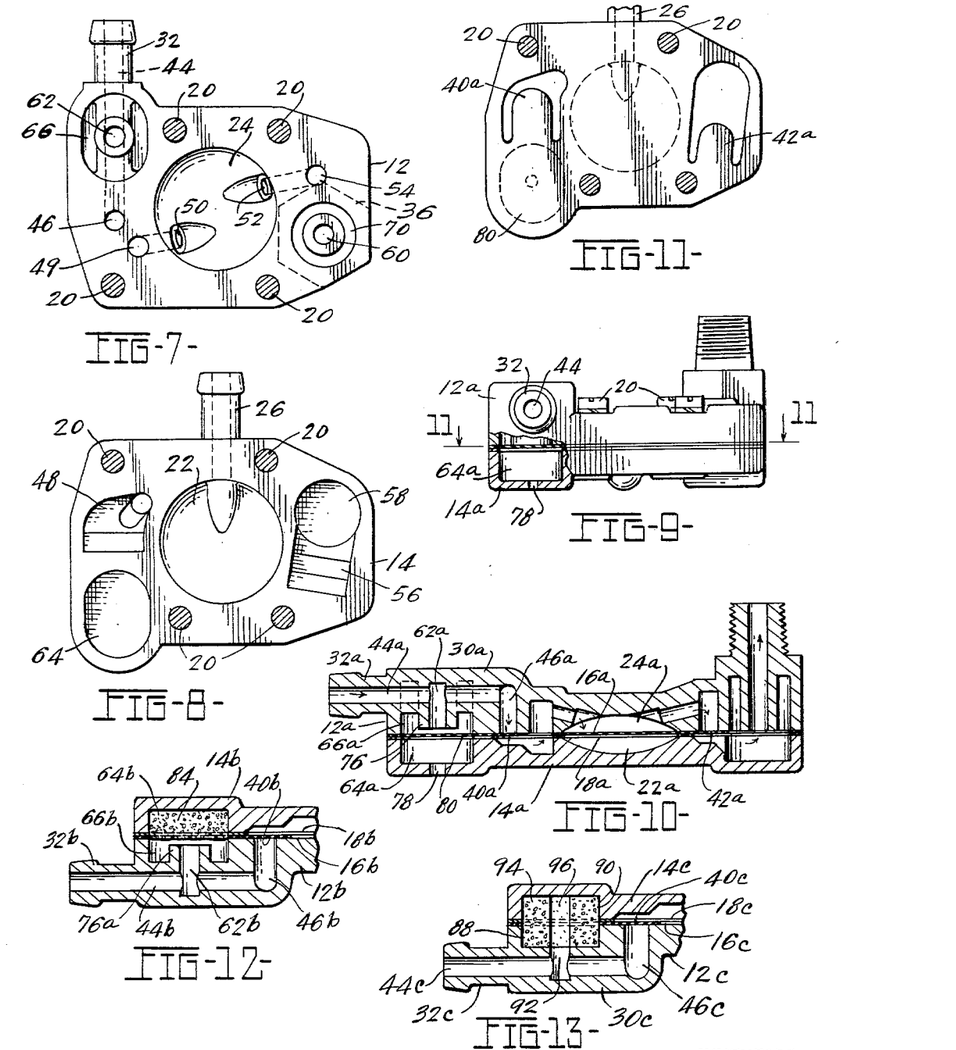
FIGURE 7 is a view taken substantially on the line 7—7 of FIGURE 1.
FIGURE 8 is a view taken substantially on the line 8—8 of FIGURE 1.
FIGURE 9 is an elevational view of a pump construction illustrating a modified form of the invention.
FIGURE 10 is a sectional view similar to FIGURE 4 illustrating the interior construction of the pump shown in FIGURE 9.
FIGURE 11 is a sectional view taken substantially on the line 11—11 of FIGURE 9.
FIGURE 12 is a detail sectional view of a fuel inlet passage construction of the pump showing a modified form of elastic cushion arrangement.
FIGURE 13 is a fragmentary detail sectional view illustrating a modified form of elastic media associated with a fuel inlet passage of the pump.

FIGURES 9 through 11 illustrate a diaphragm pump construction of the invention embodying another form of elastic or cushioning media for stabilizing or smoothing out and increasing the flow of liquid fuel at the inlet passage region of a pulse-operated, diaphragm fuel pump. The pump shown in FIGURES 9 through 11 is similar to that shown in FIGURES 1 through 8 and includes pump body members 12a and 14a fashioned with concave recesses forming respectively a pulsing or pumping chamber 22a and a fuel receiving chamber 24a.

A diaphragm 16a and a gasket 18a are disposed between the pump body components. The pump body components shown in FIGURES 9 through 11 are fashioned with fuel passages of the same character as shown in FIGURE 4 and the diaphragm 16a is provided with a fuel inlet flap valve 40a and an outlet flap valve 42a which function in the same manner as hereinbefore described with respect to the form of the invention shown in FIGURES 1 through 8. The boss portion 30a of the pump component is provided with a nipple portion 32a arranged to be connected by means of a tube (not shown) with a supply or tank of liquid fuel.

The boss portion 30a and nipple portion 32a are fashioned with a fuel inlet passage or channel 44a which is in communication with the inlet port or duct 46a adjacent the inlet valve 40a. The inlet passage 44a is associated or in communication with an elastic media for cushioning the momentum reaction of the moving liquid in the inlet passage system due to opening and closing movements of the inlet valve.

A branch or transverse passage 62a is in communication with the fuel inlet passage 44a. The body component is formed with a boss 76 which forms an inner wall of a space or chamber 66a as shown in FIGURE 10.

The body component 14a is fashioned with a recess or chamber 64a in alignment with the chamber 66a, a wall of the chamber 64a being provided with a vent opening or passage 78 open to the atmosphere. A portion 80 of the flexible pumping diaphragm 16a extends across and forms a common wall of the chambers 64a and 66a the extension 80 being an integral portion of the diaphragm 16a. During operation of the pump, pulsations or pressure surges of the liquid fuel in the fuel inlet passage 44a set up by the closing of the fuel inlet valve 40a are cushioned or some of the energy absorbed by the portion 80 of the diaphragm which is yieldable under such pressure surges as the diaphragm is fashioned of flexible or yieldable material.

Thus, in this form of the invention the chamber 64a is vented to the atmosphere through the vent 78 so that the pressure surges in the inlet passage system cause flexure or distortion of the portion 80 of the diaphragm and thereby elastically cushion the surges or pulsations of the liquid or fuel in the inlet passage system.

FIGURE 12 is a fragmentary detail sectional view illustrating a fuel inlet system for a pump construction of the character shown in FIGURES 4 or 10 embodying a modified arrangement for elastically cushioning surges or impulses in the liquid fuel moving through the inlet system of the pump.

The pump components 12b and 14b have the diaphragm 16b and a gasket 18b disposed therebetween, the body components being secured together by screws in the manner hereinbefore described in connection with the form of the invention shown in FIGURES 1 through 8.

The fuel inlet passage 44b formed in the body component 12b and the nipple portion 32b is in communication with the port or duct 46b which is controlled by the inlet flap valve 40b integrally formed on the diaphragm 16b. A branch passage or duct 62b formed in the body member 12b is in communication with the inlet passage 44b. The body component 12b is fashioned with a space or chamber 66b and the body component 14b is fashioned with a chamber 64b. Disposed in the chamber 64b is a quantity of resilient, porous or cellular material 84.

The material 84 may be porous or cellular material such as foam plastic or foam rubber or similar compressible material fashioned with or without closed cells. The quantity of material 84 is maintained in the chamber 64b by friction or the gasket 18b formed with a slight projection for the purpose. The material 84 provides a yieldable or elastic media for cushioning impulses or surges of momentum of the liquid moving through the inlet passage 44b. The porous or cellular material is advantageous in that it maintains air in the chamber 64b in the pores or open cells in the material or isolated quantities of air if the material embodies closed cells.

FIGURE 13 illustrates a modification of an elastic media for cushioning or damping impulses or surges in the fuel passage system of the pump construction. In this form, the pump component 12c is fashioned with a recess 88 and the pump component 14c provided with a mating recess 90. A diaphragm 16c and a gasket 18c are disposed between the body components 12c and 14c as hereinbefore described. The boss portion 30c and nipple portion 32c, integrally formed with the body 12c, are provided with a fuel inlet passage 44c in communication with a duct or port 46c, the latter being controlled by a flap valve 40c integrally formed on the diaphragm 16c.

In this form of construction, the diaphragm 16c and the gasket 18c do not extend across the chamber defined by the recesses 88 and 90. The component 12c is fashioned with a side branch or channel 92 communicating with the inlet passage 44c and opening into the chamber formed by the recesses 88 and 90. Disposed in the chamber defined by the recesses 88 and 90 is an annularly shaped resilient or elastic body 94 formed of porous or cellular plastic or foam plastic or foam rubber which is resistant to the deleterious effects of hydrocarbon fuels or other suitable elastic yieldable medium.

The resilient body 94 is preferably annular having a central passage 96 in registration with the side branch channel 92 forming, in effect, a continuation of the channel 92.

The resilient or yieldable material 94 provides an elastic media or cushion for stabilizing the effect of momentum impulses or surges of the liquid or liquid fuel which arise by reason of the closing action of the valve 40c and thus providing for more smooth flow of liquid or liquid fuel through the passage system in the pump.

It is to be understood that the arrangements illustrated in FIGURES 12 and 13 may also be used with the outlet passage system of the pump and perform substantially the same functions when used in association with the fuel outlet system.

Figure 14:
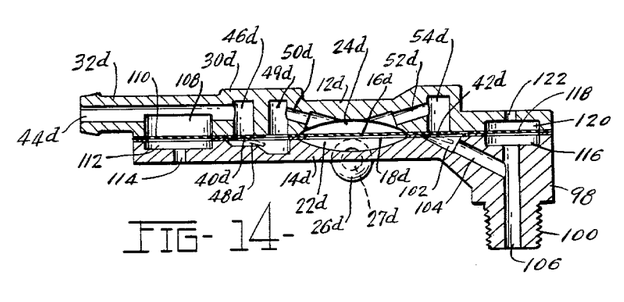
FIGURE 14 is a detail sectional view similar to FIGURE 10 illustrating a modified form of pump construction of the invention.

FIGURE 14 is a sectional view similar to FIGURE 4 illustrating a modified arrangement providing for elastically cushioning or damping surges in the liquid fuel due to opening and closing action of the inlet and outlet valves of the pump. The arrangement includes pump body members 12d and 14d assembled in mating relation, a diaphragm 16d and gasket 18d being disposed between the body members, the diaphragm being coextensive with the mating areas of the body members with the exception of the cutout portions providing the inlet valve 40d and the outlet valve 42d.

The body members are fashioned respectively with concave recesses providing a pumping chamber 22d and a fuel receiving chamber 24d, an imperforate portion of the diaphragm 16d forming a common wall of these chambers.

The body member 14d is formed with a nipple portion 26d provided with a pulsing or pumping passage 27d, the nipple portion 26d accommodating the end of a tube (not shown) connected with a source of varying fluid pressure, the varying pressures actuating or vibrating the portion of the diaphragm 16d between the pumping and fuel receiving chambers 22d and 24d.

The body 12d is provided with a boss portion 30d having an integral nipple portion 32d over which is telescoped a tube connected with a fuel tank or other supply of liquid fuel. The body member 14d is fashioned with a boss 98, the latter having a threaded portion or extension 100 which is adapted to be threaded into an inlet passage of a carburetor or other instrumentality with which the pump may be used. The nipple portion 32d is provided with a fuel inlet passage 44d communicating with a port or duct 46d adjacent the inlet valve 40d.

The pump body 14d is fashioned with a recess 48d accommodating opening movements of the inlet flap valve 40d, the recess 48d being in communication with the fuel receiving chamber 24d by interconnected passages 49d and 50d. A passage or duct 52d is provided between the chamber 24d and an outlet port 54d adjacent to the outlet valve 42d. A recess 102 in the body member 14d accommodates opening movements of the outlet valve 42d, the recess 102 being in communication by a passage 104 with a fuel outlet passage 106 formed in the boss portion 98 and the threaded extension 100.

The inlet passage 44d is in communication with a space or chamber 108, one wall of the chamber 108 being an integral imperforate portion 110 of the flexible diaphragm. The portion 110 of the diaphragm is substantially unconfined as the adjacent region of the body member 14d is formed with a recess or space 112 to accommodate yielding or elastic movements of this portion of the diaphragm, the space 112 being preferably vented to the atmosphere through a vent opening 114.

The body portion 14d is fashioned with a similar space or chamber 116 in communication with the fuel outlet passage 106. An integral imperforate portion 118 of the diaphragm forms a flexible wall of the chamber or space 116. The body member 12d adjacent the portion 118 of the diaphragm is fashioned with a recess or space 120 to accommodate flexing movements of the diaphragm portion 118, the space 120 being preferably vented to the atmosphere through an opening 122.

In this form of the invention, the imperforate diaphragm portions 110 and 118 provide the elastic or yieldable media for elastically cushioning the surges of liquid fuel moving through the passages or ducts of the pump arrangement caused by high speed opening and closing movements of the inlet and outlet valves 40d and 42d.

In the operation of the pump shown in FIGURE 14, the region of the diaphragm adjacent the chambers 22d and 24d is actuated or vibrated by pulsations or differential pressures set up by the source of varying fluid pressure, such as the crankcase of a two cycle engine, transmitted to the pumping chamber 22d through the passage 27d.

Under the vibrating movements or flexures of the said diaphragm region, the valves 40d and 42d open and close alternately to establish unidirectional flow of liquid fuel through the pump.

Upon sudden closing of the inlet valve, the momentum of the fuel moving through the inlet passage 44d is elastically cushioned, or part of the energy of the momentum absorbed or dissipated by the diaphragm portion 110 which is flexed downwardly as viewed in FIGURE 14 under the effect of the pressure surge of the fuel. The diaphragm portion 118 elastically cushions the surges of liquid fuel in the passages 104 and 106 set up by opening and closing movements of the outlet valve 42d to attain more smooth flow of liquid fuel through the pump and thus increasing the pumping efficiency, especially at higher engine speeds, as hereinbefore described in connection with the form shown in FIGURES 1 through 8.

While the spaces, chambers or recesses 112 and 120 are preferably vented to the atmosphere, venting may be omitted, and, in such construction the air trapped or confined in the spaces 112 and 120 provides additional elastic or compressible media for cushioning surges of liquid fuel moving through the pump passages. The portions 110 and 118 of the diaphragm, when employed with vented spaces 112 and 120, are substantially unconfined and the surge reactions absorbed or cushioned substantially solely by the stress or distortion of these portions of the diaphragm.

When the recesses or spaces 112 and 120 are unvented, then the surges in the liquid are cushioned or the momentum energy partially absorbed therefrom by flexure of the adjacent diaphragm portions and compression of the air confined in the unvented spaces.

FIGURES 16 through 26 illustrate a combined fuel feed and charge forming unit which, in the embodiment illustrated, includes a diaphragm type carburetor and the pump construction of the invention. While the pump construction of the invention may be combined with other types or forms of charge forming apparatus or carburetor, a carburetor of the diaphragm type of the character shown in Phillips' Patent 2,841,372 is illustrated herein.

The charge forming device or carburetor component of the combination is fashioned with a body or body member 130 formed with a mixing passage 132, the mixing passage including a Venturi 134 having a choke band or region of restriction 135. The mixing passage includes an air inlet or air horn 136 and a mixture outlet region 138. The air inlet 136 is provided with a disc-type choke valve 140 mounted upon a shaft 141 journaled in bores formed in boss portions 142 integrally formed on the carburetor body. An arm 143 is secured on an end of the shaft 141 for manipulating the choke valve.

The mixture outlet is provided with a disc-type throttle valve 144 mounted upon a shaft 145 journaled in bores formed in bosses 146 and 147 formed on the body 130. The shaft 145 is equipped with an arm 149 for manipulating the throttle valve 144.

The carburetor body 130 is fashioned at the mixture outlet end with a mounting flange 150 adapted to be secured to a crankcase 152 of a two cycle engine by bolts 153, or in a three port type of two cycle engine the carburetor is secured to the lower end of the cylinder, the carburetor being adapted to supply fuel and air mixture into the crankcase or cylinder. The air inlet end of the carburetor body may be provided with a conventional air filter or cleaner (not shown) for filtering the air entering the mixing passage.

Figures 16, 17, 18, 19, 20, 21:
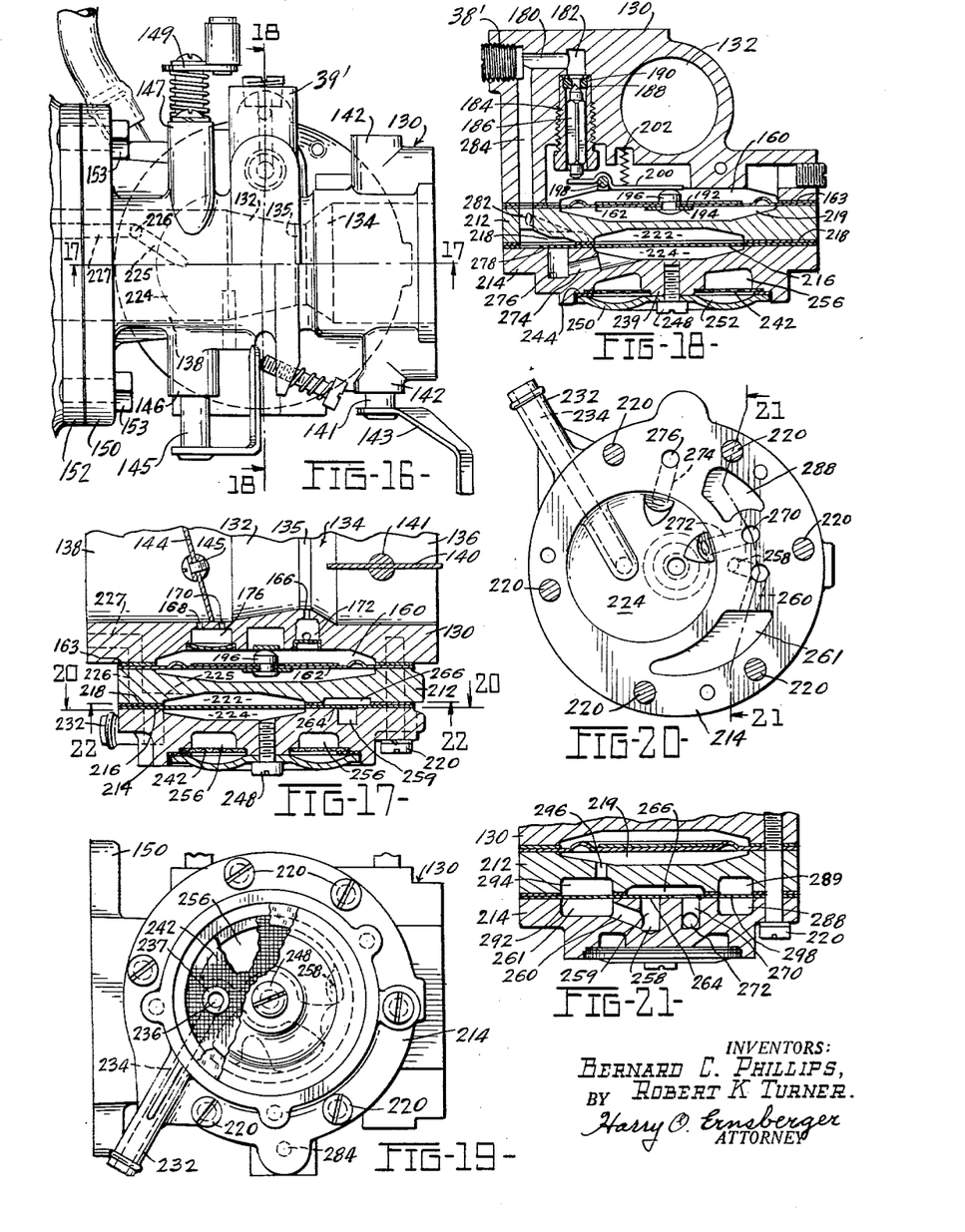
FIGURE 16 is a top plan view of a combined charge forming apparatus or carburetor and a form of fuel pump of the invention.
FIGURE 17 is a longitudinal sectional view taken substantially on the line 17—17 of FIGURE 16.
FIGURE 18 is a transverse sectional view taken substantially on the line 18—18 of FIGURE 16.
FIGURE 19 is a bottom plan view of the construction shown in FIGURE 16, certain portions being broken away for purposes of illustration.
FIGURE 20 is a view taken substantially on the line 20—20 of FIGURE 17.
FIGURE 21 is a detail sectional view taken substantially on the line 21—21 of FIGURE 20.

The body 10 is formed with a shallow, unvented fuel chamber or passage 160, a flexible membrane or diaphragm 162 forming a flexible wall of the chamber 160, as shown in FIGURES 17 and 18. An annular gasket 163 is disposed between the peripheral region of the diaphragm 162 and the carburetor body. The diaphragm 162 is fashioned of comparatively thin highly flexible cloth or fabric impregnated with a suitable coating to render the diaphragm impervious, or the diaphragm may be fashioned of flexible resinous plastic sheet or other suitable material.

The chamber 160 is adapted to receive fuel from the fuel pump under the influence of aspiration or reduced pressure in the mixing passage 132 transmitted to the unvented fuel chamber through a main orifice 166, or through a secondary orifice system including an engine idling orifice 168 and a low speed orifice 170. The main orifice 166 is in communication with a passage 172 which is in communication with the fuel chamber 160 by duct or passage means (not shown) of the character disclosed in Phillips' Patent 2,841,372.

The main orifice fuel delivery system may include adjustable means (not shown) for metering fuel flow from the chamber 160 through the main orifice. The main orifice system may be fashioned to promote the formation of a liquid of capillary seal to prevent back bleeding or reverse flow of air through the main nozzle 166 into the secondary orifice system when the idle orifice 168 or low speed orifice 170 is delivering fuel into the mixing passage. Other means of impeding or preventing reverse flow of air through the main nozzle may be employed for the purpose.

The secondary orifices 168 and 170 open into a supplemental chamber 176 which is connected through a series of passages (not shown) to receive fuel from the fuel chamber 160 in a conventional manner. The fuel chamber 160 is unvented and the delivery of fuel into the mixing passage, through either the main or secondary system, occurs through the aspiration or reduced pressure in the mixing passage effective in the fuel chamber. The aspiration in the mixing passage is the movant force controlling the flow of liquid fuel from the pump into the fuel passage or chamber 160.

The carburetor body 130 is provided with a fuel inlet passage 180 which communicates with a passage 182, as shown in FIGURE 18. Disposed within a threaded bore in alignment with the passage 182 is a threaded fitting or cage 184 having a central bore in which is disposed a slidable or relatively movable valve member 186 preferably of polygonally-shaped cross-section to facilitate fuel flow past the valve body into the chamber 160.

The valve member 186 is fashioned with a cone-shaped valve portion 188 which cooperates with a ported valve seat 190 arranged adjacent the fitting 184.

The diaphragm is provided at each side with metal or plastic discs 192 and 194 secured to the diaphragm by means of a headed rivet 196 arranged at the central region of the diaphragm. Pivoted or fulcrumed on a pin or member 198 extending into the chamber 160 is a lever 200, the long arm of the lever adapted to be engaged by the head of the rivet 196, the short arm of the lever being in engagement with the lower end of the valve member 186, as particularly shown in FIGURE 18. The valve member 186 is biased toward closed position by a comparatively weak coil spring 202 which engages the long arm of the lever at a region adjacent the fulcrum member 198.

Thus when the aspiration or reduced pressure in the mixing passage is transmitted to the fuel chamber 160, the pressure in the chamber 160 is reduced causing upward flexure of the diaphragm, as viewed in FIGURE 18, which swings the lever 200 counterclockwise and lowers the valve member 186 whereby fuel flows from the inlet passages 180 and 182 past the valve member 186 into the chamber 160 thence through the main or secondary orifice systems into the mixing passage depending on the speed and load conditions of the engine.

The fuel pump arrangement, particularly illustrated in FIGURES 17 through 23, is formed as a component structure of the carburetor.

The pump structure shown in FIGURES 17 through 23 is of the general type illustrated in FIGURE 14 wherein portions of the diaphragm provide the yieldable or elastic media for cushioning or absorbing surges of liquid fuel through the passages in the pump structure. The pump structure includes body members 212 and 214 which are arranged in mating relation, as particularly shown in FIGURES 17, 18, 21 and 23.

Figure 24:
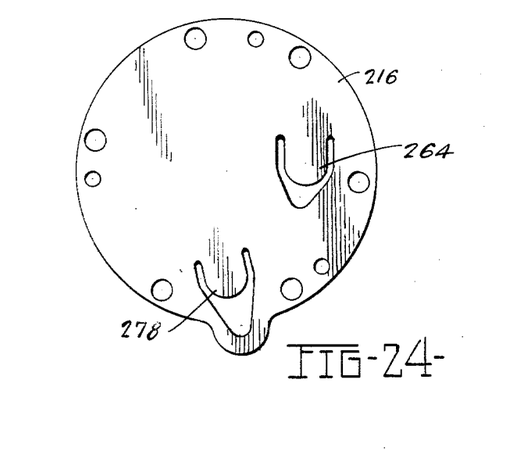
FIGURE 24 is a plan view of the pumping diaphragm in the pump construction illustrated in FIGURE 17.
Figure 25:
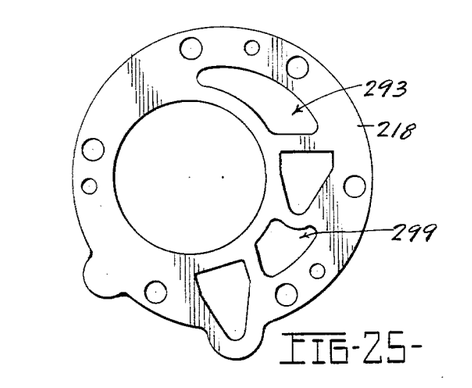
FIGURE 25 is a plan view of a gasket forming a component of the pump shown in FIGURE 17.

Disposed between the pump body components 212 and 214 is a flexible pumping diaphragm 216 and a gasket 218, the diaphragm 216 being shown per se in FIGURE 24 and the gasket 218 being shown in FIGURE 25. The assembly of pump body components 212 and 214, the diaphragm 216 and the gasket 218 are secured in assembled relation by means of screws 220 threaded into threaded openings formed in the carburetor body 130. The pump body component 212 is fashioned with a concave recess forming a pumping or pulsing chamber 222, and the pump body component 214 is fashioned with a concave recess providing a fuel receiving chamber 224, the flexible diaphragm 216 forming a common wall of the chambers.

The pumping or pulse chamber 222, in the embodiment illustrated, is adapted to be connected with the crankcase of a two cycle engine through the mounting flange 150 of the carburetor whereby the varying fluid pressures in the crankcase are transmitted to the pulsing chamber 222 to cause vibration or flexing movements of the diaphragm in synchronism with the pressure variations or differentials in the crankcase occurring during engine operation.

The body component 212 is formed with a passage 225, shown in FIGURE 17, in communication with a vertically arranged passage 226 extending upwardly through the component 212 and a lower portion of the carburetor body 130, the passage 226 being in communication with a horizontally arranged passage 227, shown in FIGURE 16, arranged in the mounting flange 150 whereby communication is established between the pulsing or pumping chamber 222 and the crankcase of the engine.

The lower pump body component 214 is fashioned with an integral nipple portion 232 which is adapted to accommodate the end of a tube for connecting the pump with a fuel tank or other supply of liquid fuel. The nipple portion 232 is fashioned with a fuel inlet passage or duct 234 which is in communication with a circularly shaped recess through a passage or duct 236, shown particularly in FIGURE 23, and formed in a depending circular boss portion 237. Depending in the central region of the recess in the component 214 is a boss 239.

Figure 23:
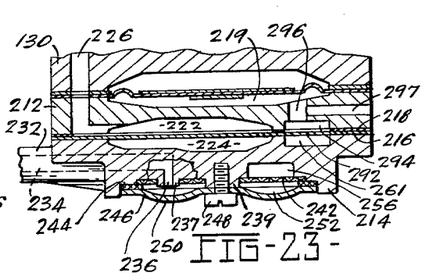
FIGURE 23 is a detail sectional view taken substantially on the line 23—23 of FIGURE 22.
Figure 26:
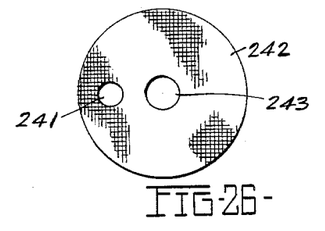
FIGURE 26 is a plan view of a fuel filter forming a component of the pump construction.

Fitted into the circular recess in the pump body component 214 is a fine mesh screen or filter 242 of circular shape, shown particularly in FIGURES 18, 23 and 26 having openings 241 and 243 to accommodate the boss portions 237 and 239. Arranged adjacent the periphery of the screen or filter 242 is an annular gasket 244. The annular recess is arranged to accommodate a closure plate or cover 246 which engages the sealing gasket 244, the central region of the plate 244 being provided with an opening accommodating a securing screw 248 threaded into an opening in the pump body member 214.

The plate 246 is fashioned with an annular region 250 of concave cross-section as shown in FIGURE 23 defining a space 252 providing a sump into which fuel flows through the inlet passage 236 from the fuel tank or other liquid supply. The region of the body component 214 above the filter is fashioned with a passage or region 256 into which the liquid fuel flows through the screen or filter 242. As shown in FIGURE 20, the body 214 is fashioned with a passage or channel 258 opening into the space 256 and which is in communication with a short passage 259 and with a passage 260, the latter opening into a chamber or space 261 formed in the upper surface region of the body component 214.

The passageway 259 is an inlet port, the port being controlled by the inlet flap valve 264. The body component 212 adjacent the inlet flap valve 264 is fashioned with a recess 266 accommodating the opening movements of the inlet valve 264. Arranged in communication with the recess 266 is a passage 268, shown in FIGURE 22 formed in the body component 212 which is in registration with a passage 270 formed in the body component 214 and shown in FIGURE 20 which is in communication with a fuel passage 272 opening into the fuel receiving chamber 224.

A passage 274 conveys fuel from the fuel receiving chamber 224 to an outlet or port 276 formed in the body component 214 and shown in FIGURE 20, the outlet port 276 being controlled by the outlet flap valve 278, shown in FIGURE 18.

Figure 22:
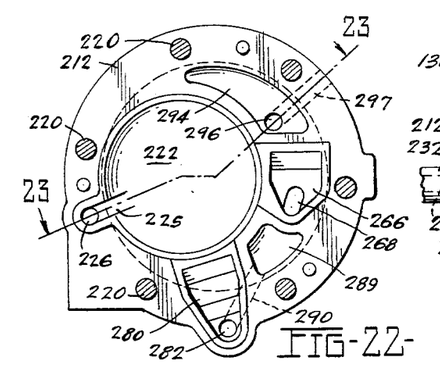
FIGURE 22 is a view taken substantially on the line 22—22 of FIGURE 17.

The fuel flows through the outlet port past the flap valve 278 into a recess 280, shown in FIGURE 22, formed in the body component 212 thence through a passage 282 which is in communication with a vertical passage 284 in the carburetor, as shown in FIGURE 18, which conveys fuel to the region of the inlet valve 188 in the carburetor.

The pump body component 214, as shown in FIGURE 20, is fashioned with a chamber or region 288 in registration with the chamber 289 formed in the body component 212. The region or space 261, shown in FIGURES 20 and 21, is a confined space defined by an imperforate region 292 of the diaphragm and the region above the portion 292 of the diaphragm is provided with a recess 294, shown in FIGURE 21, the space or recess 294 being preferably vented through a passage 296 into the space 219 below the carburetor fuel metering diaphragm 162.

The recess 294 and the space 219 are vented to the atmosphere through a vent channel or passage 297 formed in the body member 212, shown in FIGURE 23. Thus the fuel moving through the inlet passage system of the fuel pump has a side branch chamber 261 connected with the duct 259 by a branch passage 260 providing a space into which liquid fuel may surge upon rapid movement of the inlet valve whereby the portion 292 of the diaphragm will be flexed or distended upwardly into the chamber 294 to elastically cushion or absorb surge energy of the fuel in the inlet passage system.

The space 264 in the body component 212 is connected with the fuel outlet passage 282 by a branch passage 290 providing a chamber into which fuel may surge in the outlet fuel passage system of the pump. The regions of the gasket 218 are provided with open areas 293 and 299, as shown in FIGURE 25, to provide for flexing movement of the regions 292 and 298 of the diaphragm.

The portion 298 of the diaphragm forms a wall of the chamber 289 whereby surges in the outlet passage system flex or distend the portion 298 of the diaphragm upwardly as viewed in FIGURE 21 into the supplemental chamber 289 to cushion surges of the liquid fuel in the outlet passage system. Thus the regions 292 and 298 of the diaphragm are unconfined and hence elastically cushion the surges of liquid fuel, particularly at high speed vibration of the pump diaphragm, to promote greater flow of liquid fuel through the pump with improved efficiency as shown in the chart, FIGURE 15.

In the operation of the pump construction illustrated in FIGURES 16 through 26, alternate suction and pressure pulses in the crankcase of the two cycle engine are transmitted to the pulsing chamber 222 through the opening 227 in the mounting flange 150 of the carburetor and through the interconnecting passageways 225 and 226 shown in FIGURES 16 and 17. Suction or reduced pressure in the pulsing chamber 222 elevates the diaphragm causing the inlet valve 264 to be opened which effects fuel flow through the passage 234 in the nipple portion 232 from the fuel tank and connecting passage 236 into the sump 252 beneath the screen or filter 242, shown in FIGURE 23.

The fuel flows upwardly through the screen or filter through the region 256 thence through passage 258, port 259 and past the inlet flap valve 264. The liquid fuel, after passing the inlet flap valve, moves through the connecting passageways 270 and 272 (see FIGURE 20) into the fuel receiving chamber 224.

Upon a succeeding positive pressure impulse in the crankcase and transmitted to the pumping diaphragm 216, the diaphragm portion adjacent the fuel receiving chamber is moved or flexed downwardly causing the inlet valve 264 to seat, the pressure on the fuel in the chamber 222 by the diaphragm causing the fuel to move through the passageway 274 to the outlet port 276, shown in FIGURE 20, and past the outlet flap valve 278 into the recess 280 thence upwardly through the interconnecting passages 284, 180 and 182 of the carburetor, shown in FIGURE 18, to the region of the carburetor inlet control valve 186.

Fuel surge or momentum occurring in the inlet passage system of the pump is elastically cushioned or part of the energy of momentum of the fuel absorbed by flexing of the region 292 of the diaphragm by surge movements of the fuel through the branch passage 260 into the chamber 261. Fuel surge or momentum occurring in the pump passageways between the outlet valve 278 and the fuel inlet passageways in the carburetor is elastically cushioned by movement of the region 298 of the diaphragm, shown in FIGURE 21, which is connected with the fuel outlet passage system by the branch passage 290 shown in FIGURE 22.

Thus in all forms of the invention, the flow of liquid fuel through the pump is at a higher rate than has heretofore been possible through the use of the elastic cushioning means or means for absorbing energy of momentum from the fuel caused by high speed open and closing of the valves whereby the output of the pump increases generally in proportion to the increase of engine speed so that there is an ample supply of fuel for operating the engine at all speeds. These results are attained without increasing the size of the pump or the passageways formed therein.

It is apparent that, within the scope of the invention, modifications and different arrangements may be made other than as herein disclosed, and the present disclosure is illustrative merely, the invention comprehending all variations thereof.

We claim:
1. In combination, pumping means for pumping liquid for use with a charge forming apparatus including
   (a) a pump body formed of two mating parts
   (b) said mating parts each cooperating to form a series of spaced coplanar cavities having upper and lower portions
   (c) a diaphragm including gasket means connected therewith
   (d) said diaphragm and said gasket means lying in a plane intersecting said cavities and providing sealing areas between the walls of said upper and lower portions and extending substantially across the breadth and width of said mating parts
   (e) said diaphragm extending across a first of said cavities and forming a pumping chamber and a liquid receiving chamber
   (f) means communicating with a source of varying fluid pressure for actuating said diaphragm to establish pumping impulses in said liquid receiving chamber
   (g) inlet and outlet passages for conveying liquid into and away from said liquid receiving chamber
   (h) a valve for said inlet and outlet passages integrally formed on said diaphragm for controlling flow of liquid into and away from the liquid receiving chamber
   (i) a second of said cavities forming a first cushioning chamber including a cushion chamber passageway connected with said inlet passage and located upstream of said inlet valve for elastically cushioning surges of the liquid established by pumping impulses in said pumping chamber
   (j) said first cushioning chamber and said inlet and outlet valves being radially spaced outside of the periphery of said first cavity and adjacent thereto, and
   (k) said inlet passage at the connection with said cushion chamber passageway of said first cushioning chamber extending in a direction transverse to a radius of said first cavity and subsequently having a bend therein prior to opening into said liquid receiving chamber.

2. In combination, pumping means for pumping liquid for use with a charge forming apparatus as in claim 1 and having
   (a) a third cavity forming a second cushioning chamber including a cushion chamber passageway connected with said outlet passage located downstream of said outlet valve for providing additional cushioning for surges of said liquid
   (b) said second cushioning chamber being spaced radially from said outlet and inlet valves and said first cushioning chamber and lying outside the periphery of said first cavity and adjacent thereto.

3. In combination, pumping means for pumping liquid for use with a charge forming apparatus as in claim 2 and wherein
   (a) said outlet passage at the connection with said cushion chamber passageway of said second cushioning chamber extending in a direction transverse to a radius of said first cavity and having a bend therein prior to opening into said liquid receiving chamber.

4. In combination, pumping means for pumping liquid for use with a charge forming apparatus as in claim 2 and wherein
   (a) at least one of said cushioning chambers includes a resilient cushioning body therein.

References Cited by the Examiner

UNITED STATES PATENTS

| | | | |
|---|---|---|---|
| 1,796,126 | 3/1931 | Smith | 103—224 |
| 1,922,656 | 8/1933 | Berdon | 103—150 |
| 2,203,464 | 6/1940 | Harry | 103—224 |
| 2,430,151 | 11/1947 | Whitted | 103—224 |
| 2,796,838 | 6/1957 | Phillips | 261—35 |
| 3,096,721 | 7/1963 | White et al. | 103—150 |
| 3,150,601 | 9/1964 | Smith et al. | 103—150 X |
| 3,160,681 | 12/1964 | Johnson | 261—35 |

FOREIGN PATENTS 736,758   9/1955   Great Britain.

HARRY B. THORNTON, *Primary Examiner.*

RONALD R. WEAVER, *Examiner.*